United States Patent
Crombez

(10) Patent No.: US 8,190,325 B2
(45) Date of Patent: May 29, 2012

(54) SYSTEM AND METHOD FOR DISPLAYING AN INSTANTANEOUS FUEL ECONOMY OF A VEHICLE

(75) Inventor: Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 605 days.

(21) Appl. No.: 12/388,716

(22) Filed: Feb. 19, 2009

(65) Prior Publication Data

US 2010/0211240 A1 Aug. 19, 2010

(51) Int. Cl.
G06F 7/00 (2006.01)
B60W 20/00 (2006.01)

(52) U.S. Cl. .......... 701/36; 701/70; 701/32.8; 701/33.1; 701/101; 701/110; 340/439; 340/525

(58) Field of Classification Search .................. 701/22, 701/29, 36, 70, 101, 102, 110, 32.8, 33.1; 340/439, 635, 636.1, 636.15, 440–441, 455, 340/525, 636.19, 636.17, 648, 660, 669, 340/662, 663, 693.2
See application file for complete search history.

(56) References Cited

U.S. PATENT DOCUMENTS

| | | | |
|---|---|---|---|
| 4,166,382 A | 9/1979 | Petersen | |
| 4,247,757 A | 1/1981 | Crump, Jr. | |
| 4,570,226 A | 2/1986 | Aussedat | |
| 5,693,876 A | 12/1997 | Ghitea, Jr. et al. | |
| 5,913,917 A | 6/1999 | Murphy | |
| 6,092,021 A | 7/2000 | Ehlbeck et al. | |
| 6,424,157 B1 * | 7/2002 | Gollomp et al. | 324/430 |
| 6,453,731 B1 | 9/2002 | Yaegashi | |
| 6,836,122 B2 * | 12/2004 | Tojima | 324/426 |
| 6,864,807 B2 | 3/2005 | Todoriki et al. | |
| 6,985,804 B2 | 1/2006 | Minami | |
| 7,024,306 B2 | 4/2006 | Minami et al. | |
| 7,072,762 B2 | 7/2006 | Minami et al. | |
| 7,880,597 B2 * | 2/2011 | Uchida | 340/439 |
| 2005/0128065 A1 | 6/2005 | Kolpasky et al. | |
| 2007/0027593 A1 | 2/2007 | Shah et al. | |
| 2009/0040033 A1 | 2/2009 | Uchida | |

FOREIGN PATENT DOCUMENTS

| | | |
|---|---|---|
| JP | 09168202 | 6/1997 |
| WO | 2007/114410 | * 10/2007 |

OTHER PUBLICATIONS

International Search Report and Written Opinion dated Apr. 19, 2010 from the corresponding PCT Application Serial No. PCT/US10/024271 Filed Feb. 16, 2010, pp. 1-8.

* cited by examiner

*Primary Examiner* — Richard M. Camby
(74) *Attorney, Agent, or Firm* — Jennifer M. Stec; Brooks Kushman P.C.

(57) ABSTRACT

An information display system and method are provided for displaying an energy efficiency of a vehicle. The vehicle may include an engine and an electric machine that operates to provide torque to propel the vehicle. The vehicle may also include an energy source that provides energy to the electric machine. The information display system may comprise an information display configured to display an efficiency indicator, the efficiency indicator being configured to indicate an efficiency of the vehicle. The information display system may further comprise a controller configured to receive information related to the braking system of the vehicle. The controller further being configured to determine an energy efficiency value based upon the braking system information. The controller may also be configured to transmit the energy efficiency value so that the information display displays the efficiency indicator based upon the energy efficiency value.

20 Claims, 4 Drawing Sheets

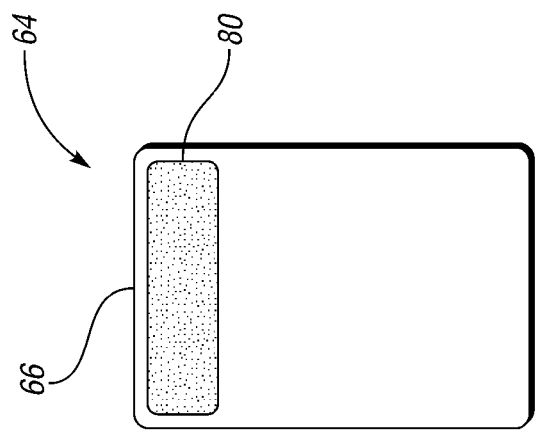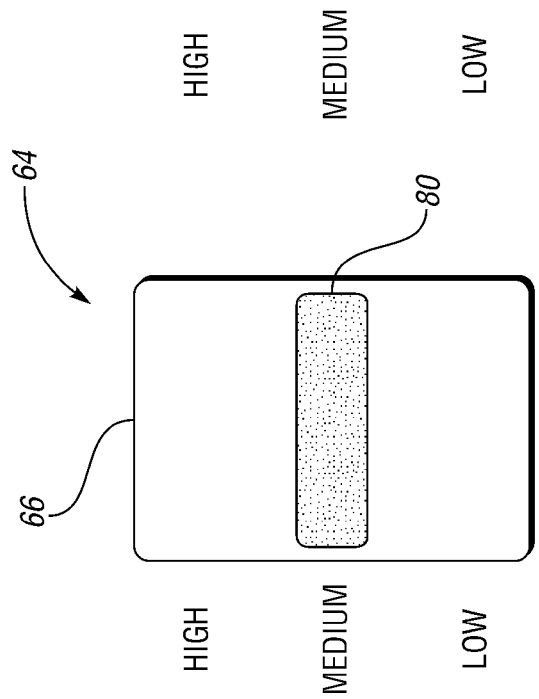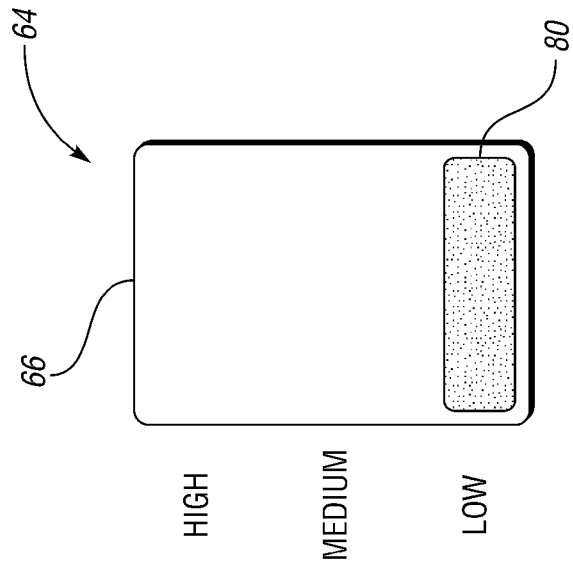

SYSTEM AND METHOD FOR DISPLAYING AN INSTANTANEOUS FUEL ECONOMY OF A VEHICLE

BACKGROUND

1. Technical Field

One or more embodiments of the present application relate to a system and method for indicating an instantaneous fuel economy (IFE) of a vehicle to an operator.

2. Background Art

Vehicles, whether passenger or commercial, include a number of gauges, indicators, and various other displays to provide the vehicle operator with information regarding the vehicle and its surroundings. With the advent of new technologies, such as hybrid electric vehicles (HEVs), has come a variety of new gauges and information displays that help operators to better learn the operation of these vehicles that utilize new technology. For example, many HEVs incorporate gauges that attempt to provide the operator with information on the various hybrid driving states. These gauges indicate to the operator when the vehicle is being propelled by the engine alone, the motor alone, or a combination of the two. Similarly, a display may indicate when the motor is operating as a generator, and is recharging an energy storage device, such as a battery.

With regard to HEVs, it is known that some operators may not be able to achieve desired overall fuel economy, in part because of driving habits. In many cases, operators are willing to modify their behavior, but are unable to translate recommended techniques into real changes in their driving habits. Moreover, conventional gauges or displays may be misleading as to how information pertaining to an instantaneous fuel economy of the vehicle may correlate into a future overall fuel economy. As such, the operator may not be able to adapt current driving habits so as to increase a future overall fuel economy.

BRIEF DESCRIPTION OF THE DRAWINGS

FIG. 2a shows in detail the information display depicted in FIG. 1;

FIG. 2b shows an alternate view of the information display depicted in FIG. 2a;

FIG. 2c shows another alternate view of the information display depicted in FIG. 2a;

DETAILED DESCRIPTION

Figure 1:
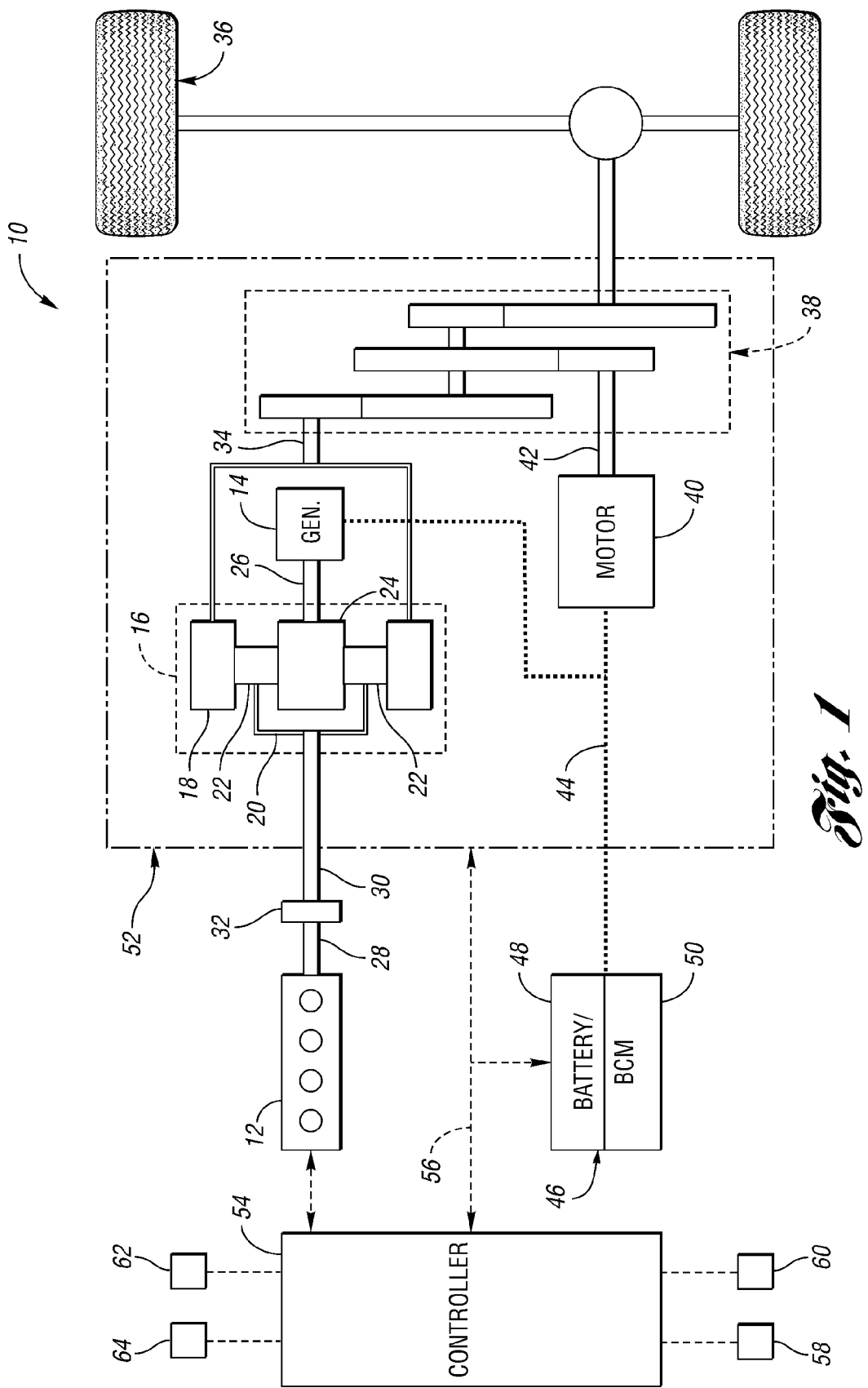
FIG. 1 shows a schematic representation of a hybrid electric vehicle including an information display in accordance with an embodiment of the present application.

FIG. 1 shows a schematic representation of a vehicle 10, which includes an engine 12 and an electric machine, or a generator 14. The engine 12 and the generator 14 are connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 outputs torque to a crankshaft 28, which is connected to a shaft 30 through a passive clutch 32. The clutch 32 provides protection against over-torque conditions. The shaft 30 is connected to the carrier 20 of the planetary gear arrangement 16, and the ring gear 18 is connected to a shaft 34, which is connected to a first set of vehicle drive wheels, or primary drive wheels 36, through a gear set 38.

The vehicle 10 includes a second electric machine, or motor 40, which can be used to output torque to a shaft 42 connected to the gear set 38. Other vehicles within the scope of the one or more embodiments of the present application may have different electric machine arrangements, such as more or fewer than two electric machines. In the embodiment shown in FIG. 1, the electric machine arrangement (i.e. the motor 40 and the generator 14) can both be used as motors to output torque. Alternatively, each can also be used as a generator, outputting electrical power to a high voltage bus 44 and to an energy storage system 46, which includes a battery 48 and a battery control module (BCM) 50.

The battery 48 is a high voltage battery that is capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle control system, shown generally as controller 54, is provided. Although it is shown as a single controller, it may include multiple controllers which may be used to control multiple vehicle systems. For example, the controller 54 may be a vehicle system controller/powertrain control module (VSC/PCM).

A controller area network (CAN) 56 allows the controller to communicate with the transmission 52 and the BCM 50. Just as the battery 48 includes a BCM 50, other devices may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present application. Although illustrated and described in the context of the vehicle 10, which is an HEV, it is understood that embodiments of the present application may be implemented on other types of vehicles, such as those powered by an engine or electronic motor alone.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. One or more embodiments of the present application further contemplate that the braking system 58 may also include a regenerative braking system, wherein braking energy is captured and stored as electrical energy in the battery 48. Of course, it should be noted that a regenerative braking system other than an electrical regenerative braking system may also be included as part of the braking system 58 (e.g., a hydraulic regenerative braking system, mechanical regenerative braking system, or the like). Similarly, the accelerator pedal 60 may include one or more sensors, which, like the sensors in the braking system 58, communicate with the controller 54.

The air conditioning system 62 also communicates with the controller 54. The on/off status of the air conditioning system can be communicated to the controller 54, and can be based on, for example, the status of an operator actuated switch, or the automatic control of the air conditioning system 62 based on related functions such as window defrost. In addition to the foregoing, the vehicle 10 includes an information display system 64, which, as explained in detail below, provides fuel economy information to the operator of the vehicle 10.

FIG. 2a generally illustrates an embodiment of the information display system 64. The information display system 64 may include an information display 66 and electronics, including software, which are not shown in FIG. 2a. The information display 66 may indicate fuel economy information using any number of analog gauges. Alternatively, the information display 66 may indicate fuel economy information using a liquid crystal display (LCD), a plasma display, an organic light emitting display (OLED), or any other display suitable to display fuel economy information.

The information display system 64 may further include a control system, which, for reference purposes, may be the controller 54 described in FIG. 1. The controller 54 may be configured to receive sensed, or non-sensed, inputs that relate to current operating conditions of the vehicle 10. Furthermore, the controller 54 may provide outputs to the information display system 64 such that the information display 66 indicates fuel economy information of the vehicle 10. Moreover, the fuel economy information displayed on the information display 66 may be an instantaneous fuel economy (IFE) indicative of an amount of fuel consumed per unit distance or the distance traveled per unit of fuel (e.g., miles per gallon).

With reference to conventional IFE gauges, the IFE information displayed using such conventional gauges may be misinterpreted by the operator, or the IFE information displayed using such conventional gauges may be misleading. Further, these conventional gauges along with conventional power assist gauges may give an operator a false sense of improved fuel economy when braking. The false sense of improved fuel economy may be attributed to the fact that, during braking, a relatively high IFE value may be displayed as well as an indication that the battery is recapturing energy using the regenerative braking system. Although regenerative braking may be a component, better overall average fuel economy is generally achieved when an operator operates the vehicle in a less aggressive manner (e.g., more mild acceleration and/or deceleration). For example, conventional gauges may lead the operator into believing that even aggressive braking improves the overall average fuel economy since the conventional IFE gauge may spike, saturate, or max out, during deceleration. In that regard, the conventional IFE gauge does not indicate to the operator that the energy recaptured by the regenerative braking system has been exhausted and that energy is being lost through the use of friction braking.

Figure 3:
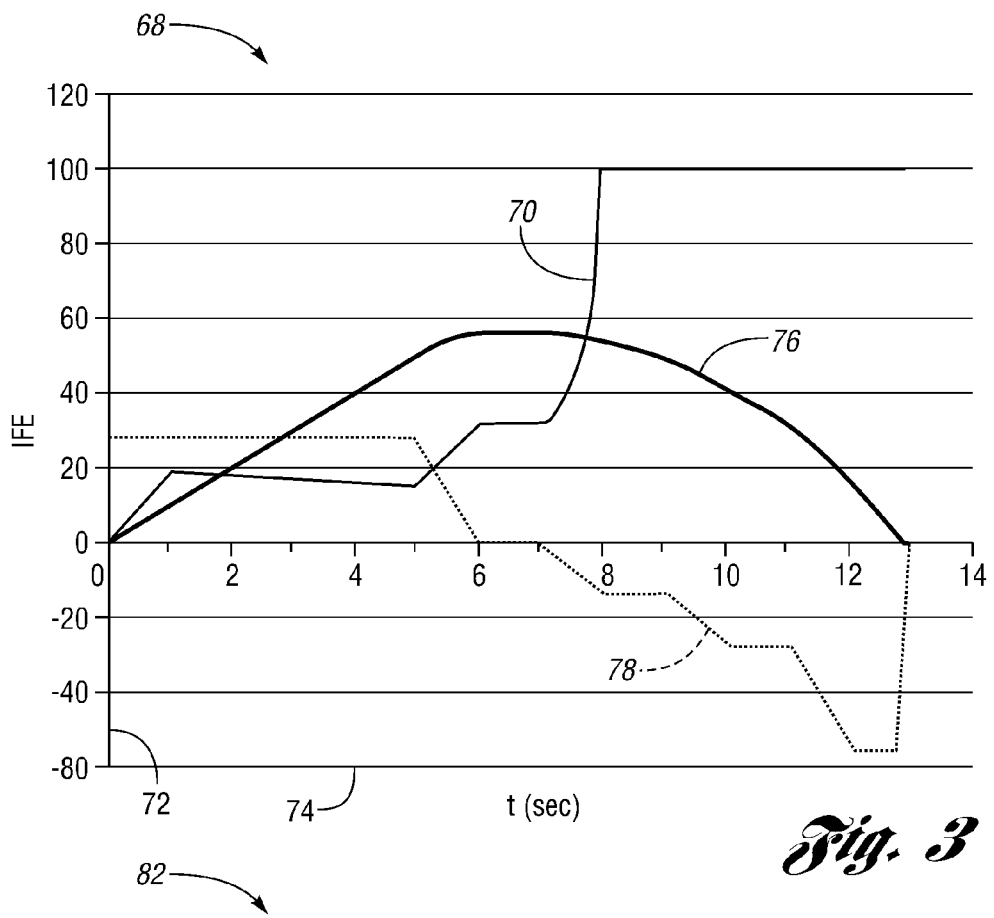
FIG. 3 is a simplified, exemplary graph illustrating one or more embodiments of the present application described herein.

With reference to the drawings, FIG. 3 is an exemplary graph 68 illustrating a conventional IFE signal 70. The graph 68 includes a vertical axis 72 that may be representative of the IFE (MPG), and a horizontal axis 74 that may be representative of a time period (seconds). The graph 68 further includes a speed signal 76 and an acceleration signal 78 overlaid onto the IFE signal 70.

The speed signal 76 and the acceleration signal 78 are overlaid onto the graph 68 in order to visually illustrate how changes with respect to these signals may affect the conventional IFE signal 70 during a particular time period. For example, the speed signal 76 may be representative of a speed which is indicative of a distance traveled per unit time. Furthermore, the acceleration signal 78 may be representative of a percentage of force (% g) required to accelerate, or alternatively decelerate, a vehicle traveling at a given speed per unit time.

One or more embodiments of the present application contemplate that the speed signal 76 and acceleration signal 78 may be based upon a unit scale that allows both signals to be superimposed over the IFE signal 70. In other words, the speed and acceleration signals (76, 78) may utilize a unit scale similar to the unit scale utilized by the IFE signal 70. For example, the unit scale of the IFE signal 70 may be a distance traveled per unit of fuel (e.g., miles per gallon). Furthermore, the unit scale of the speed signal 76 may be a distance traveled per unit of time (e.g., miles per hour). Lastly, the unit scale of the acceleration signal 78 may be a percent of gravity (% g) which may be representative of an acceleration of one (1) gravitational force as 100% g. Although the vertical axis 72 of graph 68 may be labeled as IFE, the IFE signal 70, the speed signal 76, and the acceleration signal 78 may utilize the same unit scale illustrated. As such, the unit scale illustrated may be representative of the IFE in terms of M.P.G., of the vehicle speed in terms of M.P.H, and in terms of the acceleration in terms of % g.

One or more embodiments of the present application further contemplate that a change in the speed and the acceleration signals (76, 78) may not directly influence the IFE signal 70. Instead, an external condition may result in the speed and the acceleration signals (76, 78) either increasing or decreasing, and such an external condition may also affect the IFE signal 70. For example, the IFE signal 70 may be negatively affected if the operator accelerates the vehicle 10 by aggressively depressing the accelerator pedal 60. The IFE signal 70 may be negatively affected by such an external condition due to the increase of fuel required to increase the speed and accelerate the vehicle 10. Alternatively, the IFE signal 70 may be either nominally or positively affected when the vehicle 10 descends down a sloped hill. The IFE signal 70 may be nominally or positively affected because the force of gravity may aid the vehicle 10 in descending thereby resulting in a decrease in the amount of fuel required to accelerate the vehicle 10 down the sloped hill.

With further reference to FIG. 3, the graph 68 illustrates that at the time period of 0 seconds, the IFE signal 70 indicates an IFE of 0 M.P.G. Such an IFE value may be indicative of the vehicle having traveled a distance of zero (0) miles. The graph 68 further illustrates that from the time period of 0 to 1 seconds the speed signal 76 increases at a constant rate of speed. Because the speed is increasing at a constant rate, the acceleration signal 78 remains constant. Furthermore, the conventional IFE signal 70 eventually reaches a relatively constant IFE of 20 M.P.G. The graph 68 further illustrates that from the time period of 1 to 5 seconds, the speed signal 76 continues to increase at a constant rate. Because the speed signal 76 continues to increase at a constant rate, the acceleration signal 78 remains constant. However, since the maximum IFE for such a constant speed has already been achieved during the time period of 0 to 1 second, the conventional IFE signal 70 also remains relatively constant.

With further respect to the graph 68, a slight decrease is illustrated with regard to the IFE signal 70 during the time period of 1 to 5 seconds. One or more embodiments of the present application contemplate that the slight decrease illustrated may be a result of external forces or other environmental influences that are experienced by the vehicle 10. For example, such a slight decrease in the IFE signal 70 may be a result of aerodynamic drag forces that are experienced by the vehicle 10 during during acceleration or when the vehicle 10 is operating at a constant speed.

The graph 68 further illustrates that from the time period of 5 to 7 seconds the speed signal 76 peaks and then becomes relatively constant. As a result of the speed signal 76 becoming relatively constant, the acceleration signal 78 begins to decrease between the time period of 5 to 6 seconds and eventually reaches a zero (0) acceleration value during the time period of 6 to 7 seconds. It should be noted that the acceleration signal 78 may decrease and reach a zero acceleration value as a result of the operator slightly lifting up on the accelerator pedal 60.

The graph 68 further illustrates that from the time period of 7 to 9 seconds the speed signal 76 begins to slightly decrease. This period of time between 7 and 9 seconds may include a period of time between 8 and 9 seconds in which the acceleration signal 78 becomes constantly negative preceded by a period of time between 7 and 8 seconds where the acceleration signal 78 may transition between a zero (0) value to a constant negative value. Such a correlation in the speed signal 76 may be attributed to the acceleration signal 78 decreasing from a value of zero to a relatively constant negative value. One or more embodiments of the present application contemplate that the negative acceleration value may be indicative of the amount of force required to decelerate (i.e., deceleration) the vehicle 10. Such a negative acceleration signal 78, or deceleration, may be attributed to the operator lifting up on the accelerator pedal 60 and/or slightly depressing the brake pedal.

The decrease in the acceleration signal 78 from a value of zero to a relatively constant negative value may further be indicative of a slight deceleration force that ranges between 0 to 25% g. One or more embodiments of the present application contemplate that a % g value may be representative of a deceleration force in units of gravity (g) multiplied by 100 percent (%). Therefore, a deceleration of 0.25 g (0.25 times the acceleration of gravity) corresponds to 25% g.

It should be noted that the conventional IFE signal 70 may increase during the occurrence of a slight deceleration. Such an increase in the conventional IFE signal 70 may be attributed to the vehicle no longer consuming fuel while decelerating. It should also be noted that the conventional IFE signal 70 may or may not become saturated or become a maximum value during slight deceleration. It is appreciated that the relative values represented by the speed signal 76, acceleration signal 78 and the conventional IFE signal 70 may vary depending on various parameters of the vehicle 10. However, the general behavior demonstrated by the aforementioned signals described herein may be considered typical and is understood by those of ordinary skill in the art.

As is further illustrated by the graph 68, even though a more aggressive deceleration force may be used in order to further slow the vehicle 10, the conventional IFE signal 70 has increased to a maximum value, or may have become saturated, at approximately 100 M.P.G. In reality, conventional IFE values may be higher, but conventional IFE displays, or gauges, typically have a cut-off point around 100 M.P.G.

The graph 68 further illustrates that from the time period of 9 to 11 seconds the speed signal 76 begins to moderately decrease. Such a moderate decrease in the speed signal 76 correlates to a moderate negative acceleration signal 78 or a moderate deceleration. This period of time between 9 and 11 seconds may include a period of time between 10 and 11 seconds in which the acceleration signal 78 becomes constantly negative preceded by a period of time between 9 and 10 seconds where the acceleration signal 78 may transition between a slight constantly negative value at 9 seconds to a moderate constantly negative value at 10 seconds. Such a moderate decrease in speed signal 76 may correlate to a moderately negative value (i.e., deceleration) of acceleration signal 78 during this time period. It should be noted that such a moderate deceleration may be attributed to the operator lifting up on the accelerator pedal 60 and either slightly or moderately depressing the brake pedal.

The graph 68 further illustrates that between the time periods of 11 to 13 seconds the speed signal 76 begins to aggressively decrease. This period of time between 11 and 13 seconds may include a period of time between 12 and 13 seconds in which the acceleration signal 78 becomes constantly negative preceded by a period of time between 11 and 12 seconds where the acceleration signal 78 may transition between a moderately constantly negative value at 11 seconds to a heavily constantly negative value at 12 seconds. Such an aggressive decrease in speed signal 76 may correlate to a more aggressive negative acceleration signal 78. It should be noted that such a heavy deceleration may be attributed to an operator aggressively depressing the brake pedal. Such aggressive braking on behalf of the operator may be indicative of a deceleration force being required that exceeds 25% g.

If an operator premised operation of the vehicle based upon the conventional IFE signal 70 illustrated in FIG. 3, and described above, the operator may continue to operate the vehicle under the misconception that aggressive braking may increase the conventional IFE. Further, the operator may also be under the misconception that aggressive braking may increase the overall average fuel economy. In other words, because conventional IFE displays fail to account for aggressive driving habits, the operator may not adequately modify the operation of the vehicle in a manner that optimizes the overall average fuel economy.

In light of the foregoing, FIGS. 2a-2c illustrate an information display 66 that includes an IFE indicator 80 that displays an adjusted IFE value. More particularly, the adjusted IFE value, displayed using the IFE indicator 80, may account for aggressive driving behavior which may result in a lower overall average fuel economy. For example, if the operator is aggressively decelerating the vehicle 10 (i.e., using an aggressive deceleration force), the IFE indicator 80 may indicate a low IFE value, as illustrated in FIG. 2a. Conversely, if the vehicle is operated in a more fuel efficient manner (e.g., less aggressive acceleration and deceleration), the IFE indicator 80 may indicate a high IFE value, as illustrated in FIG. 2c.

As such, the IFE indicator 80 may provide a better indication to the operator as to driving behavior that may have a positive or negative affect as to the IFE value. By displaying a more informative IFE value, the operator may modify operation of the vehicle 10 in order to increase the adjusted IFE thereby increasing the overall average fuel economy of the vehicle 10.

While the IFE indicators 80 illustrated in FIGS. 2a-2c are represented as a bar graph, one skilled in the art would understand that other methods exist to illustrate the adjusted IFE without departing from the scope of the present application. For example, the information display 66 may display the IFE indicators 80 as a numerical value. Similar to the usage of bar graph, the numerical value displayed may increase as the operator operates the vehicle in a more efficient manner.

Figure 4:
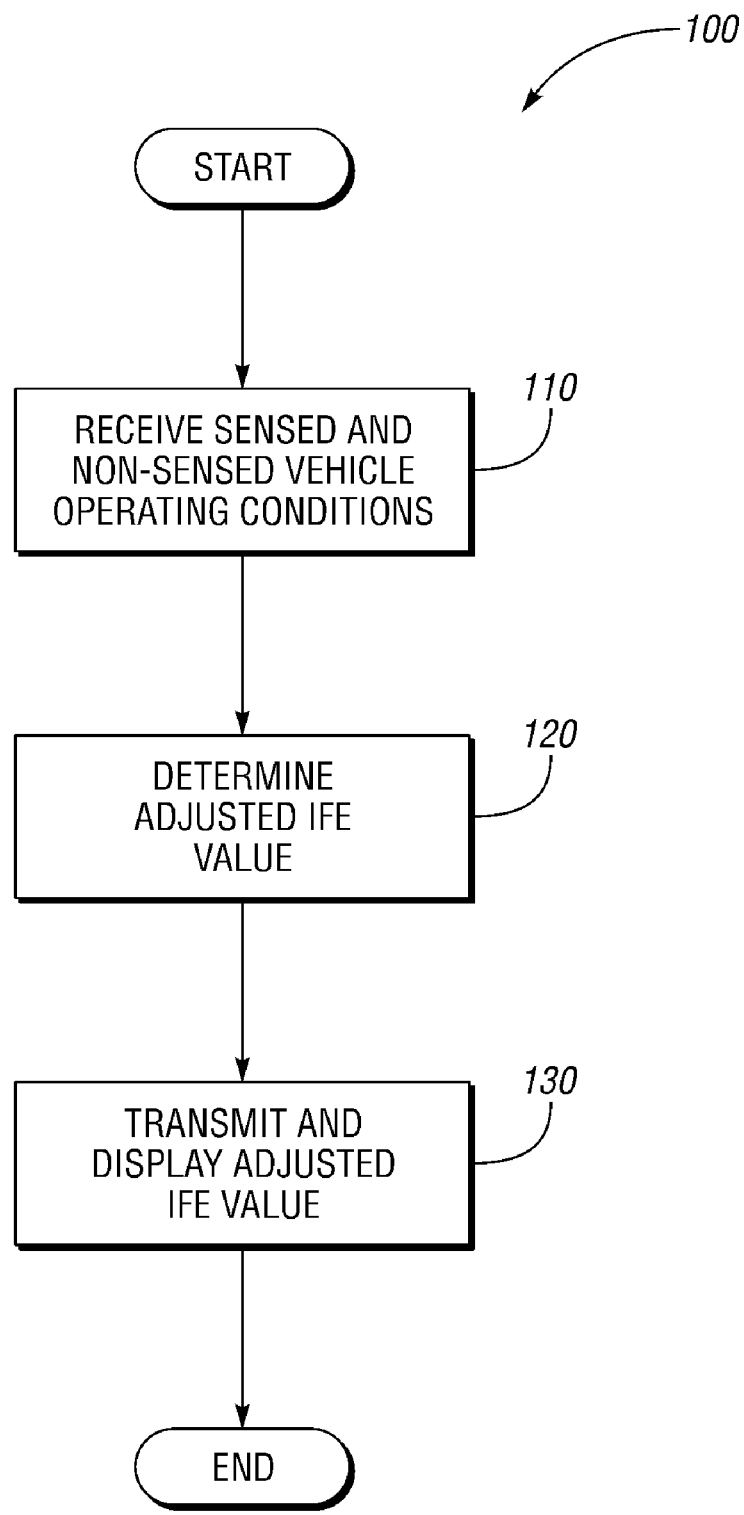
FIG. 4 is a simplified, exemplary flow chart depicting one or more embodiments of the present application described herein.

FIG. 4 illustrates a simplified, exemplary flow diagram 100 illustrating how the adjusted IFE may be determined so as to account for aggressive driving habits. However, it should be noted that the flow diagram 100 illustrated in FIG. 4 is merely exemplary, and the operation, function or steps of the method may be performed in a fashion other than the order described herein.

With reference to operation 110, any number of sensed or non-sensed vehicle inputs that correspond to current operating conditions or efficiency (e.g., IFE) of the vehicle 10 may be received. The received inputs may be used by the controller 54 to determine the adjusted IFE of the vehicle 10. For example, the number of sensed or non-sensed vehicle inputs may include an overall speed or acceleration of the vehicle 10, a current IFE of the vehicle 10, a signal indicating when the regenerative braking system is active, or a deceleration force of the vehicle 10. Once the sensed and non-sensed inputs are received by the controller 54, the flow diagram may proceed to operation 120.

In operation 120, the controller 54 may determine the adjusted IFE value by accounting for a lower IFE value based upon the vehicle 10 being operated in an inefficient manner. One or more embodiments of the present application contemplate that the current or instantaneous fuel economy may not be affected by operating the vehicle 10 in such an inefficient manner, however, the average fuel economy may be affected if the vehicle 10 is operated in an inefficient manner for an extended period of time. In order to determine the adjusted IFE value, the controller 54 may use the following, exemplary equation:

$$\text{Adjusted\_IFE} = \text{Current\_IFE} - \text{IFE\_Adjustment\_Value} \quad (1)$$

where,

Adjusted_IFE is the determined adjusted IFE value;
Current_IFE is the current IFE value that may be determined using conventional methods; and
IFE_Adjustment_Value is a determined IFE adjustment value.

Equation (1) illustrates that the controller 54 may determine the adjusted IFE value using a current IFE value and an IFE adjustment value. The current IFE value may be determined using conventional methods similar to those described above with respect to FIG. 3. The IFE adjustment value may be determined using the sensed and non-sensed inputs received in operation 110. Furthermore, the IFE adjustment value may operate to lower the current IFE value thereby indicating when the vehicle 10 is being operated in manner that may adversely affect current, or future, overall average fuel economy. In other words, the IFE adjustment value may operate to lower the current IFE value thereby indicating when the vehicle 10 is being operated in an inefficient manner.

In order to determine the IFE adjustment value, the controller 54 may use the sensed and non-sensed inputs received in operation 110. The sensed and non-sensed inputs used by the controller 54 may include, but are not limited to, information indicative of friction braking, regenerative braking, deceleration of the vehicle 10, speed of the vehicle, and an elapsed time. As stated above, the controller 54 may determine the IFE adjustment value using the sensed and non-sensed inputs in order to adjust the current IFE value when the vehicle 10 is being operated in an in an inefficient manner. Thus, the adjusted IFE value may be lower during braking than conventional IFE values so that an operator does not misinterpret that braking, more particularly aggressive braking, will always improve overall average fuel economy. In this regard, the adjusted IFE can provide an operator with an "instantaneous" indication of how current driving, or braking, habits will affect current, or future, average overall fuel economy.

For example, the controller 54 may use the IFE adjustment value to lower the current IFE value with respect to the magnitude of braking (e.g., deceleration force) used to stop the vehicle 10. Thus, more aggressive braking (e.g., deceleration force >25% g) would have a more adverse affect on the overall average fuel economy than more moderate braking (e.g., deceleration force <25% g).

In addition, the controller 54 may use the IFE adjustment value to lower the current IFE value with respect to the relationship between the total braking required to stop the vehicle 10, the amount of friction braking required to stop the vehicle 10, and the amount of energy that may be recaptured by the regenerative braking system during braking. For example, if the regenerative braking system is about to reach, or has reached, an upper limit as to the amount of energy that may be recaptured, then the IFE adjustment value may be used to lower the current IFE value. By adjusting the current IFE value downward, the operator may be informed that the regenerative braking system has reached the upper limit as to the amount of energy that may be recaptured. Alternatively, if the vehicle 10 is being stopped in a manner that requires more friction braking (e.g., aggressive braking), then the IFE adjustment value may again be used to lower the current IFE value.

In addition, the controller 54 may use the IFE adjustment value to lower the current IFE value with respect to the speed of the vehicle 10. As such, the controller 54 may adjust the current IFE value if the operating speed of the vehicle 10 increases or decreases the possibility of aggressive braking. For example, the IFE adjustment value may lower the current IFE value when the vehicle 10 begins braking at high operating speeds (e.g., >55 M.P.H.). Such an adjustment may be indicative that the regenerative braking system's capability of recapturing energy at such high operating speeds may be low. In addition, the IFE adjustment value may lower the current IFE value when the vehicle 10 is driving at low operating speeds (e.g., <10 M.P.H.). Again, the adjustment may be indicative that the regenerative braking systems ability to recapture energy at such operating speeds may be low.

Lastly, the controller 54 may use the IFE adjustment value to lower the current IFE value with respect to a predetermined time period. As such, the controller 54 may adjust the current IFE value if the vehicle 10 is operated in an inefficient manner for an extended or shortened time period. For example, if the vehicle 10 is being operated in an inefficient manner for a relatively long period of time (e.g., >5 seconds), the controller 54 may use the IFE adjustment value in order to lower the current IFE value. Such an adjustment may be indicative that the overall vehicle efficiency may be negatively affected when the vehicle 10 is operated in an inefficient manner for an extended period of time.

Figure 5:
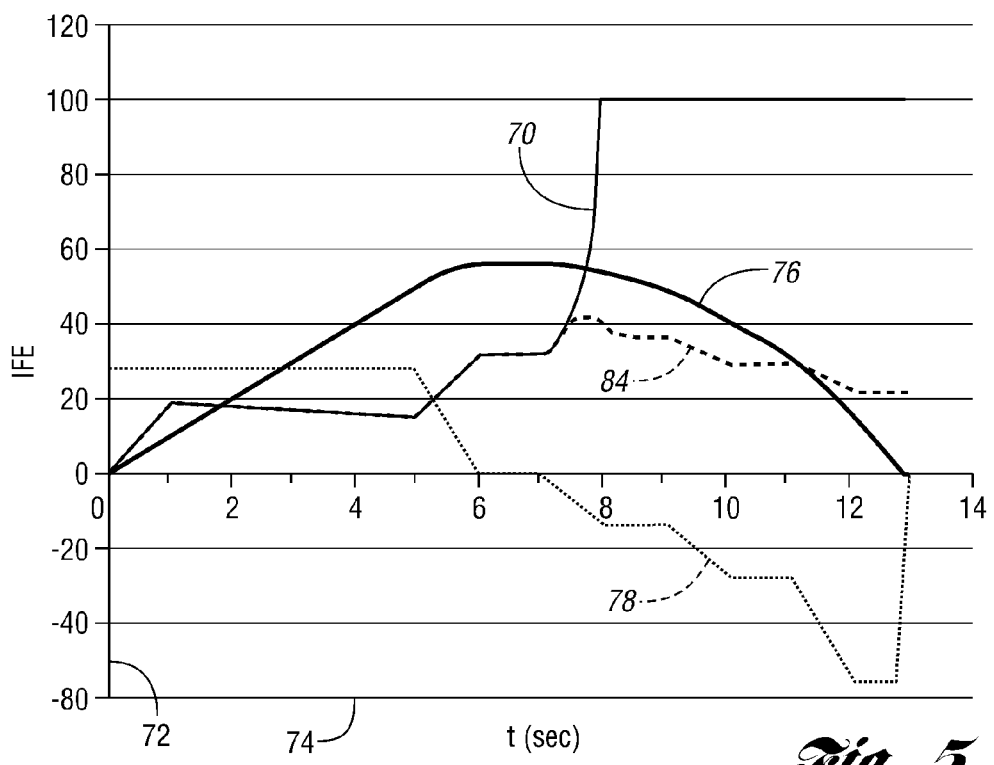
FIG. 5 is a simplified, exemplary graph illustrating one or more embodiments of the present application described herein.

With reference back to the drawings, FIG. 5 illustrates a graph 82, similar to the graph 68 illustrated in FIG. 3. However, graph 82 includes an adjusted IFE signal 84 indicative of the adjusted IFE value that may be determined using Equation (1). Similar to FIG. 3, the graph 82 includes a conventional IFE signal 70 indicative of the conventional IFE value. The graph 68 further includes a vertical axis 72 that may be representative of the IFE (MPG), and a horizontal axis 74 that may be representative of a time period (seconds). In addition, the graph 82 includes a speed signal 76 and acceleration signal 78.

One or more embodiments of the present application contemplate that the speed signal 76 and acceleration signal 78 illustrated in graph 82 may be based upon a unit scale that allows both signals to be superimposed over the IFE signal 70. In other words, the speed and acceleration signals (76, 78) may utilize a unit scale similar to the unit scale utilized by the IFE signal 70. For example, the unit scale of the IFE signal 70 may be a distance traveled per unit of fuel (e.g., miles per gallon). Furthermore, the unit scale of the speed signal 76 may be a distance traveled per unit of time (e.g., miles per hour). Lastly, the unit scale of the acceleration signal 78 may be a percent of gravity (% g) which may be representative of an acceleration of one (1) gravitational force as 100% g. Although the vertical axis 72 of graph 82 may be labeled as IFE, the IFE signal 70, the speed signal 76, and the acceleration signal 78 may utilize the same unit scale illustrated. As such, the unit scale illustrated may be representative of the IFE in terms of M.P.G., of the vehicle speed in terms of M.P.H, and in terms of the acceleration in terms of % g.

Similar to FIG. 3, the speed signal 76 and the acceleration signal 90 are overlaid onto the adjusted IFE signal 84 and the conventional IFE signal 70. It is again contemplated that the speed signal 76 and the acceleration signal 78 are not necessarily overlaid onto the graph 68 with respect to the representative units of the vertical axis 72 used with reference to the conventional IFE signal 70 or the adjusted IFE signal 84. Instead, the speed signal 76 and the acceleration signal 78 are overlaid onto the graph 68 in order to visually illustrate how changes with respect to these signals may affect the conventional IFE signal 70 or the adjusted IFE signal 84 during a particular time period.

While graph 82 does not indicate a change with respect to graph 68 during the time period of 0 to 7 seconds, graph 82 does illustrate a divergence of the adjusted IFE signal 84 during the time period of 7 to 13 seconds. During this time period, the speed signal 76 again begins to decrease. Such a decrease in the speed signal 76 correlates to a decrease in the acceleration signal 78 indicative of the amount of force required to decelerate the vehicle (e.g., deceleration force) during this time period. It should be noted that such a slight or moderate deceleration force may be attributed to an operator lifting up on the accelerator pedal 60 or slightly depressing the brake pedal. Such slight or moderate braking by the operator may account for a deceleration force that ranges between of 0 to 25% g.

It should be further noted that the conventional IFE signal 70 may increase during the occurrence of such a moderate deceleration force. Such an increase in the conventional IFE signal 70 may be attributed to the vehicle no longer consuming fuel while decelerating. However, the adjusted IFE signal 86 begins to diverge from the conventional IFE signal 70. The adjusted IFE signal 86 still increases slightly, however, the adjusted IFE signal 86 then begins to slightly decrease. As was described in further detail above, the decrease in the adjusted IFE signal 84 may be attributed to Equation (1) using the IFE adjustment value in order to account for operation of the vehicle 10 that may result in a lower IFE value.

The graph 82 further illustrates that from a time period of 11 to 13 seconds, the speed signal 76 decreases due to a more aggressive deceleration force. Such an aggressive deceleration force may be illustrated by the steeper downward slope of the acceleration signal 78. Similar to FIG. 3, the aggressive deceleration force may be attributed to the operator more aggressively depressing the brake pedal. Such aggressive braking on behalf of the operator may account for a deceleration force that exceeds 25% g.

As is further illustrated in the graph 84, while the conventional IFE signal 70 again increases, and maxes out, at approximately 100 M.P.G, the adjusted IFE signal 86 begins to decrease at a more accelerated rate. The steeper decline in the adjusted IFE signal 86 may be attributed to the IFE adjustment value from Equation (1) accounting for the aggressive deceleration force (e.g., a deceleration force >25% g) being used to brake the vehicle 10. As such, the adjusted IFE value may be a more informative indication of how current vehicle operation may impact current, or future, average overall fuel economy. Once the adjusted IFE value is determined, the flow diagram 100 may proceed to operation 130.

In operation 130, the controller 54 may transmit the adjusted IFE value so that the information display 66 displays the IFE indicator 80 based upon the adjusted IFE value. More particularly, in operation 130, the controller 54 may modify the information display 66 so as to decrease the IFE indicator 80, as illustrated FIG. 2a, or increase the IFE indicator 80, as illustrated in FIG. 2c. By displaying a more informative IFE value, the operator may learn to operate the vehicle a manner that may positively impact the average overall fuel economy.

While the best mode for carrying out the invention has been described in detail, those familiar with the art to which this invention relates will recognize various alternative designs and embodiments for practicing the invention as defined by the following claims.

What is claimed:

1. A display system comprising:
a controller configured to:
determine an actual instantaneous efficiency value based upon current vehicle operating conditions;
receive information related to a braking system; and
calculate an adjusted instantaneous efficiency value based upon the actual instantaneous efficiency value and the braking system information; and
a display, in communication with the controller, including an instantaneous efficiency indicator indicative of the adjusted instantaneous efficiency value.

2. The display system of claim 1, wherein the braking system information includes information indicative of vehicle deceleration.

3. The display system of claim 1, wherein the braking system includes a regenerative braking system and a friction braking system.

4. The display system of claim 3, wherein the braking system information includes information indicative of when the braking system is decelerating the vehicle using the regenerative braking system.

5. The display system of claim 4, wherein the braking system information further includes information indicative of an amount of energy being recaptured by the regenerative braking system during deceleration of the vehicle.

6. The display system of claim 3, wherein the braking system information includes information indicative of an amount of energy being lost using the friction braking system.

7. A display system for a vehicle comprising:
a display including an instantaneous efficiency indicator indicative of an adjusted instantaneous efficiency value;

a braking system including a regenerative braking system and a friction braking system; and a controller configured to:
- determine an actual instantaneous efficiency value based upon current vehicle operating conditions;
- receive information related to the braking system;
- determine an instantaneous efficiency adjustment value based upon the braking system information; and
- calculate the adjusted instantaneous efficiency value based on the actual instantaneous efficiency value and the instantaneous efficiency adjustment value.

8. The display system of claim 7, wherein the braking system information includes information indicative of vehicle deceleration.

9. The display system of claim 8, wherein the braking system information further includes information indicative of an amount of friction braking torque used to decelerate the vehicle using the friction braking system.

10. The display system of claim 9, wherein the braking system information further includes information indicative of an amount of energy being recaptured by the regenerative braking system during deceleration of the vehicle.

11. The display system of claim 1, wherein calculating the adjusted instantaneous efficiency value includes:
- determining an instantaneous efficiency adjustment value; and
- reducing the actual instantaneous efficiency value by the instantaneous efficiency adjustment value.

12. The display system of claim 11, wherein the instantaneous efficiency adjustment value is based at least in part upon an amount of friction braking torque relative to the total braking torque used to decelerate a vehicle.

13. The display system of claim 11, wherein an increase in vehicle deceleration increases the instantaneous efficiency adjustment value.

14. The display system of claim 11, wherein an increase in vehicle deceleration increases the instantaneous efficiency adjustment value.

15. The information display system of claim 7, wherein the actual instantaneous efficiency value is an actual instantaneous fuel economy value.

16. A method comprising:
- calculating an actual instantaneous efficiency value based upon current vehicle operating conditions;
- calculating an instantaneous efficiency adjustment value based upon vehicle braking system information;
- calculating an adjusted instantaneous efficiency value based on the actual instantaneous efficiency value and the instantaneous efficiency adjustment value; and
- displaying an instantaneous efficiency indicator corresponding to the adjusted instantaneous efficiency value.

17. The method of claim 16, wherein the vehicle braking system information includes information indicative of vehicle deceleration using a regenerative braking system and the friction braking system.

18. The method of claim 17, further comprising:
- increasing the instantaneous efficiency adjustment value upon an increase in friction braking torque relative to total braking torque.

19. The method of claim 16, wherein calculating the adjusted instantaneous efficiency value includes subtracting the instantaneous efficiency adjustment value from the actual instantaneous efficiency value.

20. The method of claim 16, wherein the actual instantaneous efficiency value is an actual instantaneous fuel economy value.

* * * * *